United States Patent
Huang et al.

(10) Patent No.: US 12,005,688 B2
(45) Date of Patent: Jun. 11, 2024

(54) COMPOSITE CLOTH

(71) Applicants: Chen-Cheng Huang, Taipei (TW);
Pao-Han Huang, Taipei (TW);
Pao-Hao Huang, Taipei (TW)

(72) Inventors: Chen-Cheng Huang, Taipei (TW);
Pao-Han Huang, Taipei (TW);
Pao-Hao Huang, Taipei (TW)

(*) Notice: Subject to any disclaimer, the term of this patent is extended or adjusted under 35 U.S.C. 154(b) by 0 days.

(21) Appl. No.: 17/320,000

(22) Filed: May 13, 2021

(65) Prior Publication Data
US 2021/0291483 A1    Sep. 23, 2021

Related U.S. Application Data

(63) Continuation-in-part of application No. 16/183,383, filed on Nov. 7, 2018, now abandoned.

(30) Foreign Application Priority Data

Nov. 10, 2017  (TW) .................................. 106138922

(51) Int. Cl.
*B32B 3/24* (2006.01)
*A41D 31/04* (2019.01)
(Continued)

(52) U.S. Cl.
CPC .............. *B32B 3/266* (2013.01); *A41D 31/04* (2019.02); *A41D 31/102* (2019.02);
(Continued)

(58) Field of Classification Search
None
See application file for complete search history.

(56) References Cited

U.S. PATENT DOCUMENTS 2,144,514 A * 1/1939 Speh ..................... A41D 3/00
2/87
2,275,425 A * 3/1942 Grabec .................. B44C 1/16
156/220
(Continued)

FOREIGN PATENT DOCUMENTS

CN     102029760 A  *  4/2011
CN     201931673 U  *  8/2011
(Continued)

OTHER PUBLICATIONS

Machine Translation of JP-55-036349-A, Mar. 1983 (Year: 1983).*
(Continued)

*Primary Examiner* — Jeffrey A Vonch
(74) *Attorney, Agent, or Firm* — HSML P.C.

(57) ABSTRACT

A composite cloth includes a fabric sheet and at least one functional film. The fabric sheet defines multiple micropores extending therethrough. The functional film is bonded to a first surface of the fabric sheet, and includes a fabric sheet-binding portion which is bonded to and conforms with the first surface of the fabric sheet, and multiple protrusion-forming portions which are connected to the fabric sheet-binding portion and which define multiple vacuum-molded protrusions extending into corresponding ones of the micropores. Each of the vacuum-molded protrusions has an open end defining an opening which extends through the fabric sheet such that each of the vacuum-molded protrusions is in spatial communication with a corresponding one of the micropores.

20 Claims, 5 Drawing Sheets

(51) Int. Cl.

| | | |
|---|---|---|
| *A41D 31/06* | (2019.01) | |
| *A41D 31/102* | (2019.01) | |
| *A41D 31/14* | (2019.01) | |
| *A41D 31/26* | (2019.01) | |
| *B32B 3/26* | (2006.01) | |
| *B32B 3/30* | (2006.01) | |
| *B32B 5/02* | (2006.01) | |
| *B32B 5/14* | (2006.01) | |
| *B32B 7/02* | (2019.01) | |
| *B32B 7/05* | (2019.01) | |
| *B32B 7/08* | (2019.01) | |
| *B32B 27/08* | (2006.01) | |
| *B32B 27/12* | (2006.01) | |
| *B32B 27/32* | (2006.01) | |
| *B32B 27/36* | (2006.01) | |
| *B32B 27/40* | (2006.01) | |

(52) U.S. Cl.
CPC ......... *A41D 31/145* (2019.02); *A41D 31/265* (2019.02); *B32B 3/30* (2013.01); *B32B 5/022* (2013.01); *B32B 5/024* (2013.01); *B32B 5/142* (2013.01); *B32B 7/02* (2013.01); *B32B 7/05* (2019.01); *B32B 7/08* (2013.01); *B32B 27/08* (2013.01); *B32B 27/12* (2013.01); *B32B 27/32* (2013.01); *B32B 27/36* (2013.01); *B32B 27/40* (2013.01); *A41D 31/065* (2019.02); *B32B 2250/02* (2013.01); *B32B 2250/03* (2013.01); *B32B 2250/05* (2013.01); *B32B 2274/00* (2013.01); *B32B 2307/21* (2013.01); *B32B 2307/212* (2013.01); *B32B 2307/71* (2013.01); *B32B 2307/724* (2013.01); *B32B 2307/7265* (2013.01); *B32B 2437/00* (2013.01); *Y10T 428/24289* (2015.01); *Y10T 428/24322* (2015.01); *Y10T 428/24942* (2015.01); *Y10T 442/3854* (2015.04)

(56) References Cited

U.S. PATENT DOCUMENTS

| | | | | |
|---|---|---|---|---|
| 2,361,682 A * | 10/1944 | Grabec | B44C 1/16 | 264/293 |
| 3,043,738 A * | 7/1962 | Szabady | B32B 27/00 | 156/322 |
| 3,165,432 A * | 1/1965 | Plaskett | B32B 27/00 | 156/244.21 |
| 3,190,781 A * | 6/1965 | Metz, Jr. | B32B 37/1018 | 425/115 |
| 4,194,041 A * | 3/1980 | Gore | D06N 3/183 | 2/87 |
| 4,454,191 A * | 6/1984 | von Blucher | D06N 3/08 | 428/314.2 |
| 4,520,048 A * | 5/1985 | Ranger | B05C 9/14 | 118/643 |
| 4,554,198 A * | 11/1985 | von Blucher | D06N 3/14 | 2/457 |
| 4,857,393 A * | 8/1989 | Kato | B32B 27/12 | 442/76 |
| 4,927,683 A * | 5/1990 | Tsutsui | D06M 11/83 | D5/1 |
| 5,134,025 A * | 7/1992 | Zenda | D06N 3/0043 | 428/327 |
| 5,196,240 A * | 3/1993 | Stockwell | D06P 1/926 | 427/389.9 |
| 5,908,690 A | 6/1999 | Schultz et al. | | |
| 6,438,755 B1 * | 8/2002 | MacDonald | A41D 13/0015 | 2/69 |
| 6,479,154 B1 * | 11/2002 | Walton | A41D 31/185 | 428/424.4 |
| 2003/0015684 A1 * | 1/2003 | Goldenhersh | D06M 13/335 | 252/8.81 |
| 2003/0143381 A1 * | 7/2003 | Hurten | B32B 27/12 | 428/196 |
| 2003/0194547 A1 * | 10/2003 | Fuhrmann | B01D 71/36 | 442/76 |
| 2003/0201582 A1 * | 10/2003 | Gray | A61F 13/51104 | 264/154 |
| 2004/0023575 A1 * | 2/2004 | Patel | B32B 27/32 | 442/76 |
| 2004/0051082 A1 * | 3/2004 | Child | D06M 15/248 | 252/500 |
| 2004/0121678 A1 * | 6/2004 | Baldwin, Jr. | B32B 37/1207 | 442/364 |
| 2004/0132367 A1 * | 7/2004 | Rock | A41D 31/065 | 442/79 |
| 2005/0020161 A1 * | 1/2005 | Dummer | B32B 27/36 | 442/361 |
| 2005/0075028 A1 * | 4/2005 | Rock | D04B 1/14 | 442/244 |
| 2005/0246813 A1 | 11/2005 | Davis et al. | | |
| 2006/0048263 A1 * | 3/2006 | Walsh | A41D 27/10 | 2/69 |
| 2006/0059599 A1 | 3/2006 | Lai | | |
| 2006/0228962 A1 * | 10/2006 | Souther | D04H 3/16 | 442/364 |
| 2007/0022510 A1 * | 2/2007 | Chapuis | A41D 27/28 | 2/69 |
| 2008/0274307 A1 * | 11/2008 | Chereau | B32B 7/12 | 428/17 |
| 2009/0031486 A1 * | 2/2009 | Sokolowski | A41D 1/08 | 2/243.1 |
| 2009/0068412 A1 * | 3/2009 | Nahmias | B32B 27/12 | 428/221 |
| 2009/0088037 A1 * | 4/2009 | Covelli | B32B 7/12 | 526/348 |
| 2009/0162621 A1 * | 6/2009 | Craamer | D06M 16/00 | 427/75 |
| 2009/0181599 A1 * | 7/2009 | Farmer | A41D 31/00 | 450/86 |
| 2010/0048075 A1 * | 2/2010 | Cheng | D06M 11/74 | 427/389.9 |
| 2010/0071112 A1 * | 3/2010 | Iwashita | B32B 27/12 | 428/221 |
| 2010/0130085 A1 * | 5/2010 | Yu | B32B 27/32 | 442/370 |
| 2010/0255270 A1 * | 10/2010 | Stuebiger | D06M 15/564 | 442/139 |
| 2010/0287680 A1 * | 11/2010 | Johnson | B32B 27/12 | 156/60 |
| 2011/0083246 A1 | 4/2011 | Vitarana | | |
| 2011/0223388 A1 * | 9/2011 | Stone | B29C 66/91935 | 156/219 |
| 2011/0314780 A1 * | 12/2011 | Gonzalez | B32B 27/12 | 428/137 |
| 2012/0023631 A1 * | 2/2012 | Fischer | B63C 11/04 | 2/2.15 |
| 2012/0276332 A1 * | 11/2012 | Conolly | D06M 11/79 | 428/221 |
| 2013/0004747 A1 * | 1/2013 | Schwarz | D06N 7/0092 | 428/196 |
| 2013/0042380 A1 * | 2/2013 | Goodman | A41D 31/125 | 2/69 |
| 2013/0161998 A1 * | 6/2013 | Uebelacker | B60N 2/5891 | 297/452.1 |
| 2013/0256936 A1 * | 10/2013 | Ou | B32B 37/1018 | 264/101 |
| 2013/0276996 A1 * | 10/2013 | Huang | A47G 5/00 | 160/330 |
| 2014/0363625 A1 | 12/2014 | Huang et al. | | |
| 2015/0079863 A1 * | 3/2015 | Majumdar | D06M 11/46 | 252/520.5 |
| 2015/0309219 A1 * | 10/2015 | Butz | G02B 5/0891 | 359/361 |
| 2016/0257091 A1 * | 9/2016 | Fornoni | B32B 3/30 | |
| 2017/0171959 A1 * | 6/2017 | Huang | H05K 1/028 | |

(56) References Cited

U.S. PATENT DOCUMENTS

| | | | |
|---|---|---|---|
| 2017/0226691 A1* | 8/2017 | Farmer | B32B 7/05 |
| 2017/0282488 A1* | 10/2017 | Feng | B32B 5/028 |
| 2017/0282529 A1* | 10/2017 | Hohberg | B32B 27/32 |
| 2018/0154622 A1* | 6/2018 | Howland | B32B 1/00 |
| 2018/0271184 A1* | 9/2018 | Shalev | A41D 31/14 |
| 2018/0343932 A1* | 12/2018 | Gosse | A41D 1/04 |
| 2018/0352883 A1* | 12/2018 | Schlee | A41D 31/102 |
| 2018/0354223 A1* | 12/2018 | Huang | B32B 5/024 |
| 2019/0009496 A1* | 1/2019 | Trouba | B32B 27/36 |

FOREIGN PATENT DOCUMENTS

| | | | | |
|---|---|---|---|---|
| CN | 202005281 U | * | 10/2011 | |
| CN | 202068999 U | * | 12/2011 | |
| CN | 104188140 A | * | 12/2014 | |
| CN | 204249493 U | * | 4/2015 | |
| CN | 206186485 U | * | 5/2017 | |
| CN | 107187132 A | * | 9/2017 | ............. A61G 13/10 |
| DE | 1 014 313 B | | 8/1957 | |
| DE | 1764201 U | * | 4/1958 | ........... A62B 17/003 |
| DE | 35 19 905 A1 | | 12/1986 | |
| DE | 3519905 A1 | * | 12/1986 | ............... D06N 7/00 |
| DE | 3815720 A1 | * | 11/1989 | ............. A41D 31/02 |
| DE | 10224860 A1 | * | 12/2003 | ......... A41D 31/0038 |
| DE | 102016221238 A1 | * | 5/2018 | ........... A62B 17/003 |
| EP | 123965 A2 | * | 11/1984 | ............. B32B 27/12 |
| EP | 0 825 018 A2 | | 2/1998 | |
| GB | 940 704 | | 10/1963 | |
| GB | 1 364 455 | | 8/1974 | |
| GB | 1 462 042 | | 1/1977 | |
| JP | 53-111167 A | | 9/1978 | |
| JP | 56151551 A | * | 11/1981 | |
| JP | 55-036349 A | * | 3/1983 | |
| JP | 62083145 A | * | 4/1987 | |
| JP | 62231088 A | * | 10/1987 | |
| JP | 62289681 A | * | 12/1987 | |
| JP | 02206547 A | * | 8/1990 | |
| JP | 04014434 A | * | 1/1992 | |
| JP | 5-247854 A | | 9/1993 | |
| JP | 05247854 A | * | 9/1993 | |
| JP | 5-295669 A | | 11/1993 | |
| JP | 2001-174008 A | | 6/2001 | |
| JP | 2005105493 A | * | 4/2005 | |
| JP | 2007296797 A | * | 11/2007 | |
| JP | 2008184693 A | * | 8/2008 | |
| JP | 2010167743 A | * | 8/2010 | |
| JP | 2012040829 A | * | 3/2012 | |
| JP | 2012091411 A | * | 5/2012 | |
| KR | 2006105808 A | * | 10/2006 | ......... A41D 13/0015 |
| KR | 2009041581 A | * | 4/2009 | |
| KR | 2012132744 A | * | 12/2012 | |
| WO | WO-2008154009 A1 | * | 12/2008 | ......... C08G 18/0885 |
| WO | WO-2011047701 A1 | * | 4/2011 | ............... A41D 3/00 |
| WO | 2015119037 A1 | | 8/2015 | |
| WO | 2017136621 A1 | | 8/2017 | |
| WO | 2019077637 A1 | | 4/2019 | |
| WO | WO-2019077637 A1 | * | 4/2019 | ............. B32B 27/12 |

OTHER PUBLICATIONS

Machine Translation of JP-62083145-A, Apr. 1987 (Year: 1987).*
Machine Translation of DE-1764201-U, Apr. 1958 (Year: 1958).*
Machine Translation of JP-2005105493-A, Apr. 2005 (Year: 2005).*
Machine Translation of DE-102016221238-A1, May 2018 (Year: 2018).*
Machine Translation of DE 35 19 905 A1, Dec. 1986 (Year: 1986).
Machine Translation of EP 0 825 018 A2, Feb. 1998 (Year: 1998).
Machine Translation of WO 2015119037 A1, May 2015 (Year: 2015).
Machine Translation of JP 53-111167 A, Sep. 1978 (Year: 1978).
Machine Translation of JP 5-247854 A, Sep. 1993 (Year: 1993).
Machine Translation of JP 5-295669 A, Nov. 1993 (Year: 1993).
Machine Translation of DE 1 014 313 B, Aug. 1957 (Year: 1957).

* cited by examiner

COMPOSITE CLOTH

CROSS-REFERENCE TO RELATED APPLICATION

This application is a continuation-in-part application of U.S. patent application Ser. No. 16/183,383 filed on Nov. 7, 2018, which claims priority of Taiwanese Invention Patent Application No. 106138922, filed on Nov. 10, 2017. The entire content of each of the U.S. and Taiwanese patent applications is incorporated herein by reference.

FIELD

The disclosure relates to a composite cloth, and more particularly to a composite cloth including at least one functional film.

BACKGROUND

A functional cloth having a predetermined function, such as waterproof, cool-feeling, anti-ultraviolet, etc., has been widely developed in recent years based on wearing requirements. One conventional method for making the functional cloth involves soaking a fabric sheet in a liquid substance containing functional components so as to bond the functional components and the fabric sheet. However, the functional components bonded to the fabric sheet will be in contact with a wearer's skin when the functional cloth is worn, which may result in an adverse effect on the wearer's health. Furthermore, the fabric sheet of the functional cloth may have poor durability due to the soaking method. Another conventional method for making the functional cloth involves coating the functional components on a surface of the fabric sheet. However, the functional components cannot be evenly distributed on the surface of the fabric sheet due to irregularity of the surface thereof, and the coated functional components may easily peel off from the fabric sheet and thus fail to function effectively.

SUMMARY

Therefore, an object of the disclosure is to provide a composite cloth that can alleviate at least one of the drawbacks of the prior art.

According to the disclosure, a composite cloth includes a fabric sheet and at least one functional film.

The fabric sheet has opposite first and second surfaces and defines a plurality of micropores extending through the first and second surfaces.

The at least one functional film is bonded to the first surface of the fabric sheet, conforms with the first surface of the fabric sheet, and is formed with a plurality of vacuum-molded protrusions extending into corresponding ones of the micropores.

The at least one functional film has at least one functional component, and includes a fabric sheet-binding portion and a plurality of protrusion-forming portions. The fabric sheet-binding portion is bonded to the first surface of the fabric sheet. The protrusion-forming portions are connected to the fabric sheet-binding portion and define the vacuum-molded protrusions. Each of the vacuum-molded protrusions has an open end distal to the first surface of the fabric sheet. The open end defines an opening that extends through the first and second surfaces of the fabric sheet such that each of the vacuum-molded protrusions is in spatial communication with a corresponding one of the micropores.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
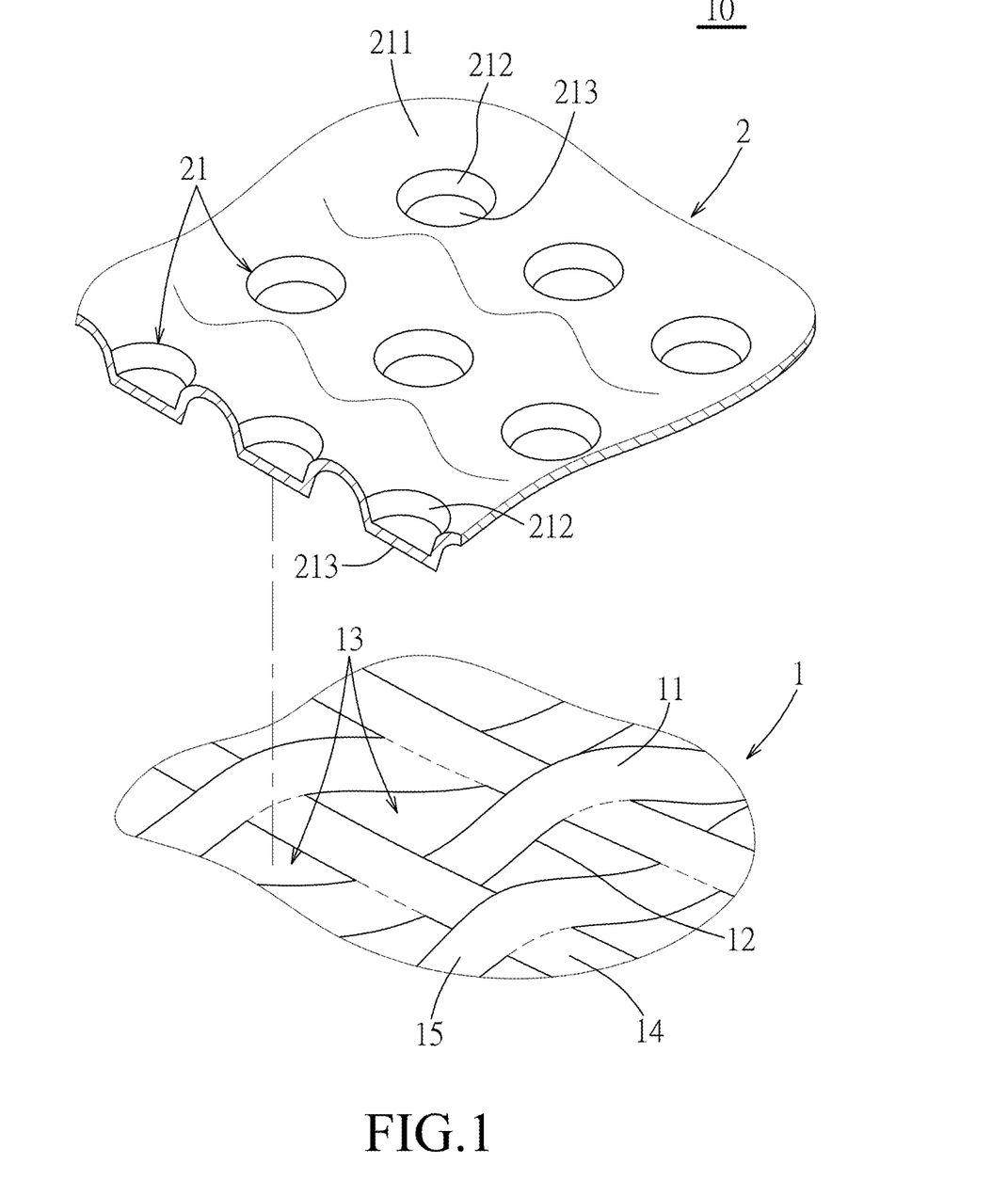
FIG. 1 is a fragmentary exploded perspective view illustrating a first embodiment of a composite cloth according to the disclosure.
Figure 2:
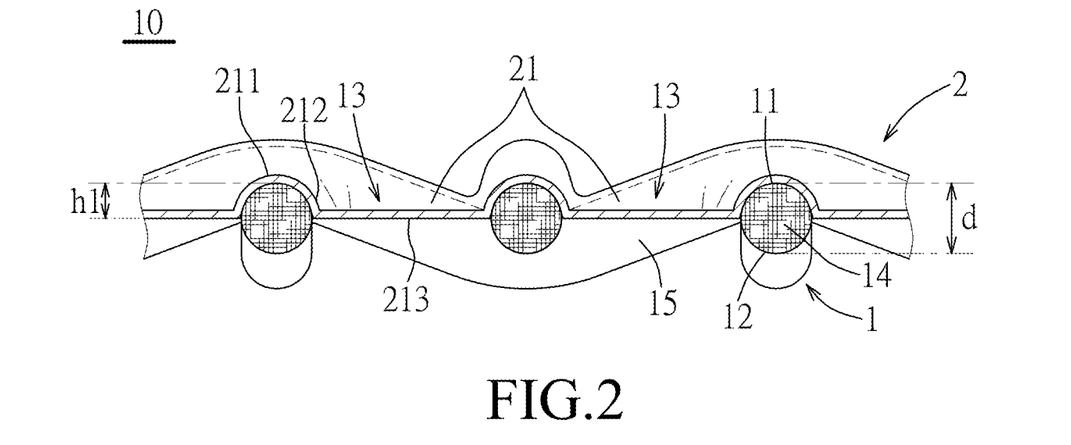
FIG. 2 is a fragmentary cross-sectional view illustrating the first embodiment.

Referring to FIGS. 1 and 2, a first embodiment of a composite cloth 10 according to the disclosure includes a fabric sheet 1 and at least one functional film 2. The composite cloth 10 may be substantially free of adhesive, namely, the composite cloth 10 may contain no adhesive component. In this embodiment, the composite cloth 10 is exemplified to include one functional film 2.

The fabric sheet 1 has opposite first and second surfaces 11, 12 and defines a plurality of micropores 13 that extend through the first and second surfaces 11, 12. The fabric sheet 1 may be made of a woven fabric, a nonwoven fabric or other suitable fabrics. The fabric sheet 1 may be substantially free of adhesive. In this embodiment, the fabric sheet 1, which may contain no adhesive, is made of the woven fabric which includes a plurality of warp yarns 14 and a plurality of weft yarns 15 interlaced with each other to define the micropores 13 thereamong. In one form, the fabric sheet 1 has a multi-layered structure.

The functional film 2 is bonded to the first surface 11 of the fabric sheet 1, conforms with the first surface 11 of the fabric sheet 1, and is formed with a plurality of vacuum-molded protrusions 21 extending into corresponding ones of the micropores 13. The functional film 2 has at least one functional component for providing a desired function. The functional film 2 may be substantially free of adhesive. The functional film 2 may be made from a thermoplastic base material mixed with the functional component, and the thermoplastic base material may be selected from polyolefin, polyester, and a thermoplastic elastomer. In this embodiment, the thermoplastic base material of the functional film 2 is made from polyurethane elastomer. In one form, the functional component is not limited to be coated on a surface of the functional film 2.

More specifically, the functional film 2 includes a fabric sheet-binding portion 211 bonded to the first surface 11 of the fabric sheet 1, and a plurality of protrusion-forming portions 212 which are connected to the fabric sheet-binding portion 211 and which define the vacuum-molded protrusions 21. Each of the vacuum-molded protrusions 21 has a closed end 213 distal to the first surface 11 of the fabric sheet 1.

The functional component of the functional film 2 may be selected from: an anti-ultraviolet (UV) component; a waterproof component; a vapor-permeable component, such as polyethylene oxide-modified polyurethane dispersion (PEO-modified PUD); an antistatic component; a water-repellent component, such as Teflon® textile finishes and Teflon®, Fabric Protectors available from DuPont; a cooling component, such as such as erythritol and xylitol; an electromagnetic wave-shielding component, such as aluminum-containing phenol-formaldehyde resin; and combinations thereof. The selection of the functional component of the functional film 2 is based on practical requirements. The functional film 2 may have a plurality of the functional components, such that the functional film 2 has a plurality of the predetermined functions corresponding to the functional components.

To be specific, the first embodiment of the composite cloth 10 of the disclosure may be produced by disposing a raw functional film on the fabric sheet 1 with the micropores 13; placing the fabric sheet 1 and the raw functional film over a screen mold (not shown); heating the fabric sheet 1 and the raw functional film to soften the raw functional film; vacuum-forming the softened raw functional film with a suction force to form the functional film 2 provided with the vacuum-molded protrusions 21 extending into corresponding ones of the micropores 13, and melt-bonding the functional film 2 to the fabric sheet 1 so as to form the composite cloth 10; cooling the composite cloth 10; and releasing the composite cloth 10 from the screen mold. By way of the vacuum-molding techniques, the functional film 2 is entirely covered on the fabric sheet 1, and hardly peels off from the fabric sheet 1.

As shown in FIG. 2, each of the vacuum-molded protrusions 21 of the functional film 2 has a height (h1) measured from, the closed end 213 to the fabric sheet-binding portion 211. The height (h1) of each of the vacuum-molded protrusions 21 is no less than half of a minimum distance (d) between the first and the second surfaces 11, 12 of the fabric sheet 1. Therefore, the closed ends 213 of the vacuum-molded protrusions 21 of the functional film 2, which are the closest areas of the functional film 2 to a wearer's skin, are isolatable from the wearer's skin.

Figure 3:
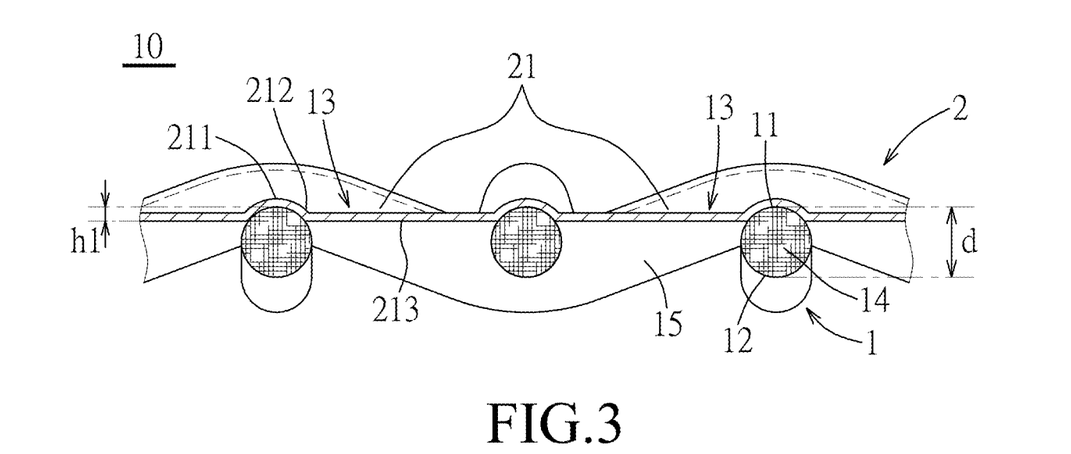
FIG. 3 is a fragmentary cross-sectional view illustrating a second embodiment of the composite cloth according to the disclosure.

Referring to FIG. 3, a second embodiment of the composite cloth 10 according to the disclosure is illustrated. The second embodiment of the composite cloth 10 has a structure similar to that of the first embodiment, except that the height (h1) of each of the vacuum-molded protrusions 21 of the functional film 2 is adjusted to be less than that of the first embodiment, i.e., the height (h1) of each of the vacuum-molded protrusions 21 is less than half of the minimum distance (d) between the first and the second surfaces 11, 12 of the fabric sheet 1. Hence, a distance between the second surface 12 and the closed end 213 of each of the vacuum-molded protrusions 21 is larger than that of the first embodiment. Therefore, the functional film 2 is further isolated from the wearer's skin.

The second embodiment of the composite cloth 10 may be made in a manner similar to that of the first embodiment, except that the suction force applied to the raw functional film and the fabric sheet 1 is controlled to be smaller than the suction force applied for making the first embodiment. Hence, the height (h1) of the vacuum-molded protrusions 21 is adjustable to be less than that of the first embodiment.

Figure 4:
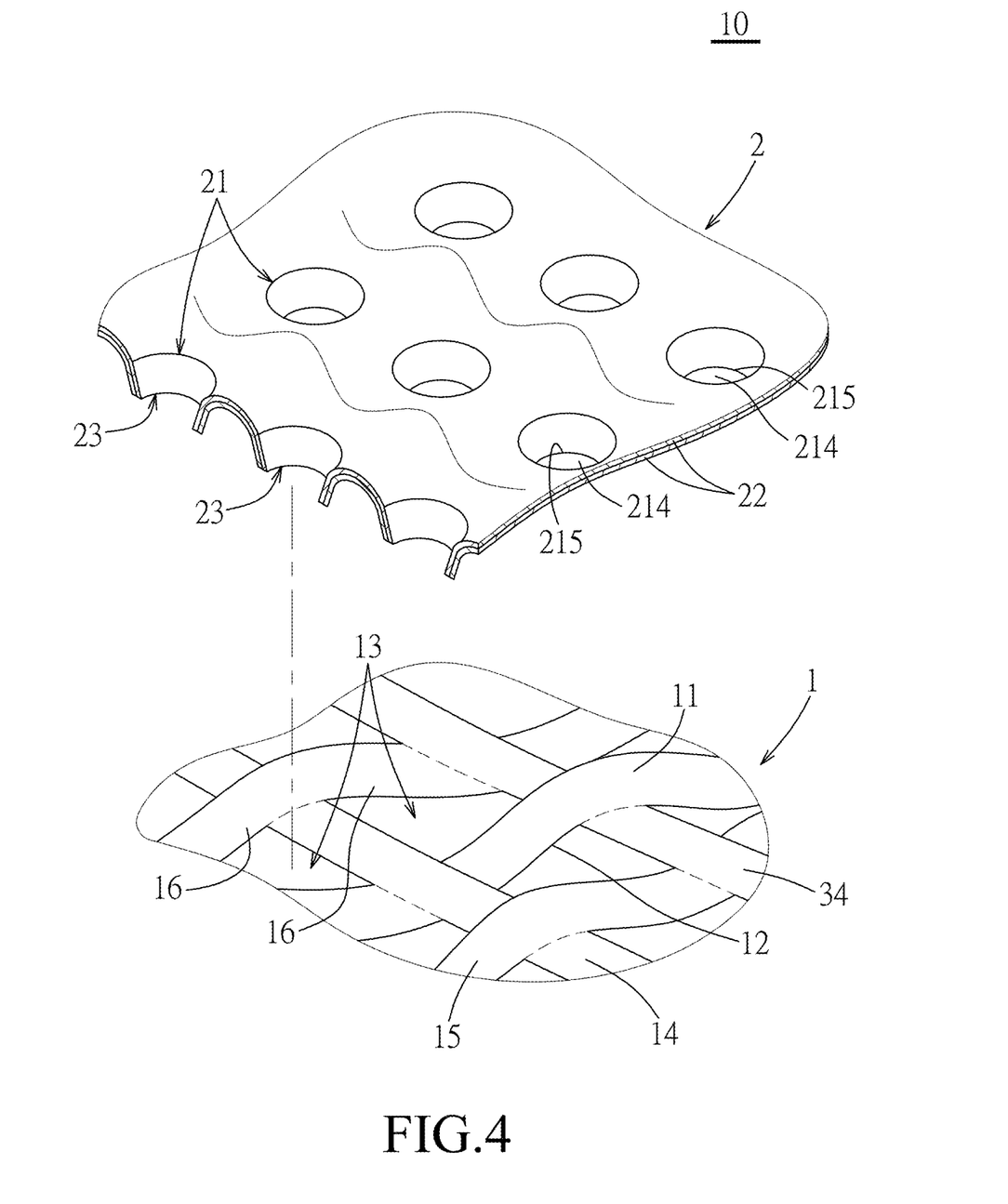
FIG. 4 is a fragmentary exploded perspective view illustrating a third embodiment of the composite cloth according to the disclosure.
Figure 5:
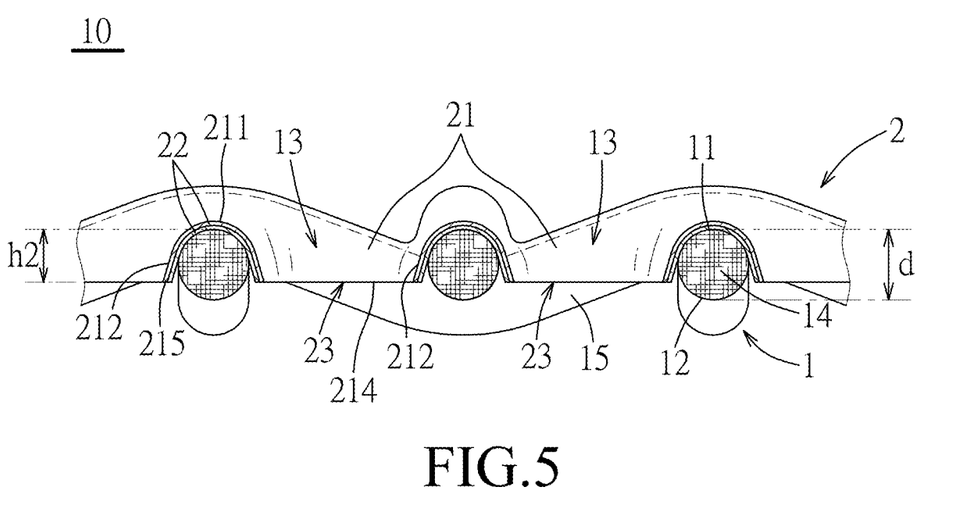
FIG. 5 is a fragmentary cross-sectional view illustrating the third embodiment.

Referring to FIGS. 4 and 5, a third embodiment of the composite cloth 10 according to the disclosure is illustrated, and has a structure similar to that of the first embodiment except for the following differences. The functional film 2 may include a plurality of functional layers 22 and a plurality of the functional components. Each of the functional layers 22 may have one or more of the functional components so that the functional film 2 is multi-functional. In this embodiment, the functional film 2 includes two of the functional layers 22 that are stacked on each other and that include two different ones of the functional components, respectively, such as the anti-ultraviolet component and the water-repellent component.

In this embodiment, each of the vacuum-molded protrusions 21 has an open end 214 distal to the first surface 11 of the fabric sheet 1. The open end 214 of each of the vacuum-molded protrusions 21 defines an opening 23 that extends through the first and second surfaces 11, 12 of the fabric sheet 1, such that each of the vacuum-molded protrusions 21 is in spatial communication with a corresponding one of the micropores 13, thereby improving vapor permeability of the composite cloth 10.

Each of the vacuum-molded protrusions 21 of the functional film 2 has a height (h2) measured from a peripheral edge 215 surrounding the open end 214 to the fabric sheet-binding portion 211. It should be noted that a contact area between the fabric sheet 1 and the functional film 2 would be increased when the height (h2) of each of the vacuum-molded protrusions 21 is increased. The height (h2) may be greater than half of a minimum distance (d) between the first and second surfaces 11, 12. Alternatively, the height (h2) may be less than the minimum distance (d) between the first and second surfaces 11, 12.

In certain embodiments, the protrusion-forming portions 212 of the vacuum-molded protrusions 21 are directly and entirely bonded to the fabric sheet 1 without the need of adhesive. With such configuration, bonding strength between the functional film 2 and the fabric sheet 1 can be further enhanced, and peeling of the functional film 2 from the fabric sheet 1 due to an external force can be avoided.

The third embodiment of the composite cloth 10 can be made in a manner similar to that of the first embodiment, except that the suction force applied to the raw functional film and the fabric sheet 1 is controlled to be greater than that applied for making the first embodiment. Alternatively, each of the vacuum-molded protrusions 21 of the third embodiment may be formed with a closed end 213 as those of the first and second embodiments, and the closed end 213 of each of the vacuum-molded protrusions 21 of the first and second embodiments may be replaced with the open end 214 that defines the opening 23.

By controlling the suction force used in vacuum-molding for making the molded-vacuum protrusions 21, the heights (h1, h2) of the vacuum-molded protrusions 21 are adjustable according to various requirements. When the height (h1) is relatively small, i.e., the vacuum-molded protrusions 21 is relatively distal to the second surface 12, the vacuum-molded protrusions 21 will be isolated from the wearer's skin with a greater extent. With a precondition of isolating the functional film 2 from the wearer's skin, when the height (h2) is relatively large, the contact area between the fabric sheet 1 and the protrusion-forming portion 212 of each of the vacuum-molded protrusions 21 is relatively increased, and the bonding strength between the functional film 2 and the fabric sheet 1 will be enhanced accordingly.

Figure 6:
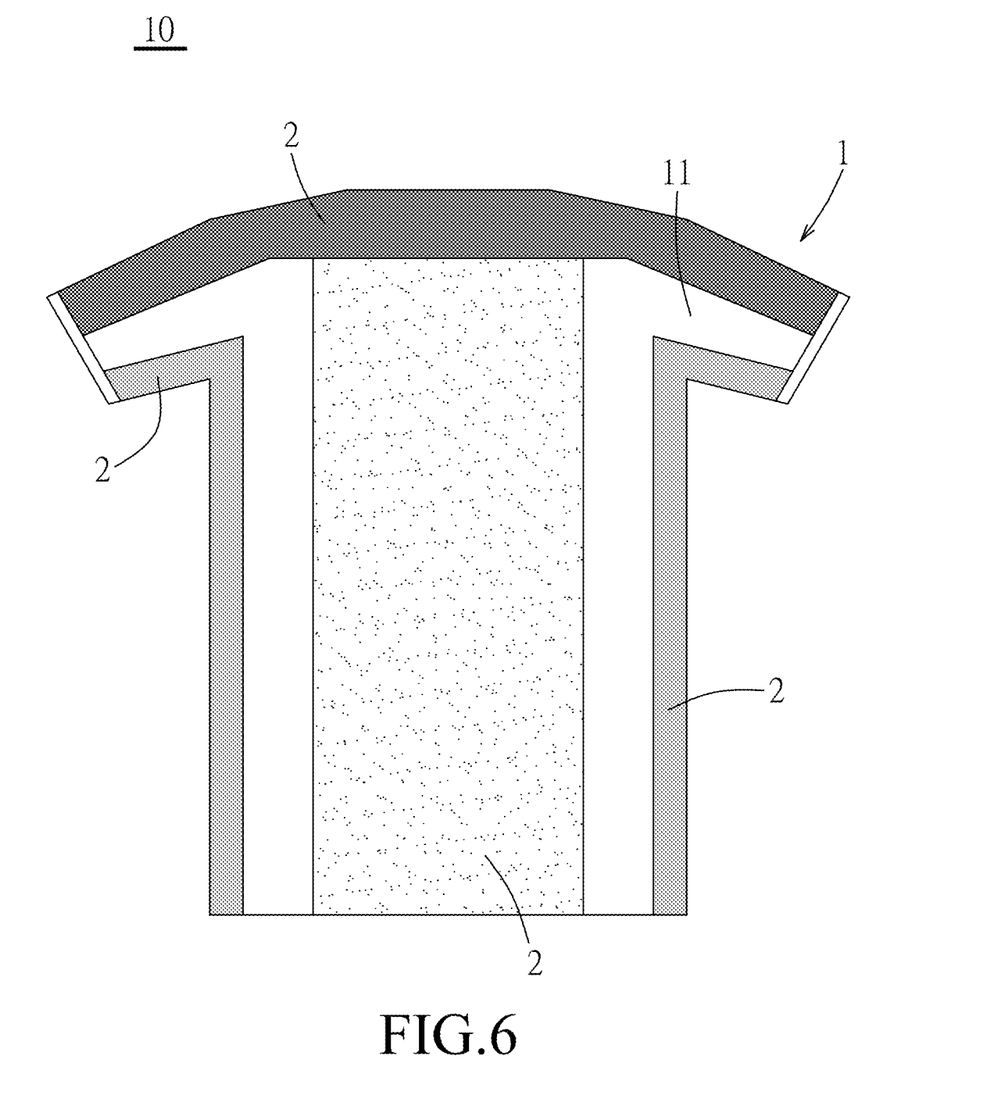
FIG. 6 is a back view illustrating a fourth embodiment of the composite cloth according to the disclosure.

Referring to FIG. 6, a fourth embodiment of the composite cloth 10 according to the disclosure is illustrated. The composite cloth 10 is formed into a top clothing (only the back side thereof is shown). In this embodiment, the at least one functional film 2 is exemplified to include a plurality of the functional films 2 that are independently bonded to the first surface 11 of the fabric sheet 1. The first surface 11 of the fabric sheet 1 is an outer surface of the top clothing, and the second surface 12 of the fabric sheet 1 is an inner surface (not shown) of the top clothing. In this embodiment, four of the functional films 2 that are independently bonded to the fabric sheet respectively have different ones of the above mentioned functional components. Hence, the top clothing has four different functional regions respectively corresponding in position to the four functional films 2. To be specific, the functional component included in one of the functional films 2 that is located at the shoulder part of the top clothing is the anti-ultraviolet component. The functional component included in another one of the functional films 2 that is located at the back part of the top clothing is the cooling component. The other two of the functional films 2 are respectively located at the sleeve regions of the top clothing, which respectively covers the wearer's arms from the armpits to the wrists or elbows. The other two functional films 2 include the vapor-permeable component. By way of designing the functional films 2 to be respectively placed at the different regions of the composite cloth 10, the composite cloth 10 has multiple functional regions that correspond in position to the different body parts of the wearer.

To sum up, by virtue of the structural design of the vacuum-molded protrusions 21 of the at least one functional film 2 being bonded to the fabric sheet 1, the at least one functional film 2 including one or more of the functional component will not be in contact with the wearer's skin when the composite cloth 10 is worn. The composite cloth 10 is made breathable with the openings 23 of the at least one functional film 2 corresponding in position to the micropores 13 of the fabric sheet 1. Furthermore, the position and number of the functional films 2 and the number of the functional layers 22 of each of the functional films 2 may be adjusted based on actual use so that the composite cloth 10 has multi-functional properties.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from, one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite cloth, comprising:
   a fabric sheet that has opposing first and second surfaces and defining a plurality of micropores extending through said first and second surfaces; and
   a plurality of functional films that are independently bonded to said first surface of said fabric sheet at different functional regions of said composite cloth, wherein each of said functional films conforms with said first surface of said fabric sheet to define a fabric sheet-binding portion that is bonded to said first surface of said fabric sheet and a plurality of protrusion-forming portions connected to the fabric sheet-binding portion, each of said protrusion-forming portions defining a vacuum-molded hollow protrusion extending into a corresponding one of said micropores, the vacuum-molded hollow protrusion having an open end or a closed end distal from said first surface of said fabric sheet, each of said vacuum-molded hollow protrusions having a height measured from a peripheral edge surrounding said open end or said closed end to said first surface of said fabric sheet, said height being greater than about half a minimum distance between said first and second surfaces, wherein said functional films are melt-bonded to said first surface of said fabric sheet so as to form said composite cloth that is substantially free of adhesive,
   wherein each of said functional films comprises a plurality of functional components and a plurality of functional layers, said functional layers being stacked on top of each other, each of said functional layers including one or more of said functional components, wherein one of said functional components in one of said functional layers is different in function from another one of said functional components in another one of said functional layers, and
   wherein one of said functional components in one of said functional films in one of said different functional regions of said composite cloth is different from another one of said functional components in another one of said functional films in another one of said different functional regions of said composite cloth.

2. The composite cloth of claim 1, wherein said protrusion-forming portions are directly and entirely bonded to said fabric sheet.

3. The composite cloth of claim 1, wherein said fabric sheet is made of one of a woven fabric and a nonwoven fabric.

4. The composite cloth of claim 3, wherein said fabric sheet is made of the woven fabric and includes a plurality of warp yarns and a plurality of weft yarns interlaced with each other to define said micropores thereamong.

5. The composite cloth of claim 1, wherein the composite cloth is free of adhesive.

6. The composite cloth of claim 1, wherein said functional film is made from a thermoplastic base material mixed with the functional component, said thermoplastic base material being selected from polyolefin, polyester, and a thermoplastic elastomer.

7. The composite cloth of claim 6, wherein said thermoplastic base material is made from polyurethane elastomer.

8. The composite cloth of claim 1, wherein the one or more of said functional components of each of said functional layers are selected from the group consisting of an anti-ultraviolet (UV) component, a waterproof component, a vapor-permeable component, an antistatic component, a water-repellent component, a cooling component, an electromagnetic wave-shielding component, and combinations thereof.

9. The composite cloth of claim 1, wherein said one of said functional components in said one of said functional layers is an anti-ultraviolet (UV) component and said another one of said functional components in said another one of said functional layers is a waterproof component.

10. The composite cloth of claim 1, wherein said one of said functional components in said one of said functional films is an anti-ultraviolet (UV) component and said another one of said functional components in said another one of said functional films is a cooling component and/or a vapor-permeable component.

11. A top clothing comprising the composite cloth of claim 10, said top clothing comprising different functional regions comprising an anti-ultraviolet region (UV) along a shoulder part, cooling regions extending from an armpit part along a lower sleeve part and/or down side torso parts, and a vapor-permeable region located along a back torso part, each of said functional regions corresponding in position to one of said functional films comprising the corresponding functional component.

12. A composite cloth, comprising:
a fabric sheet that has opposing first and second surfaces and defining a plurality of micropores extending through said first and second surfaces; and
a plurality of functional films that are independently bonded to said first surface of said fabric sheet at different functional regions of said composite cloth, wherein each of said functional films conforms with said first surface of said fabric sheet to define a fabric sheet-binding portion that is bonded to said first surface of said fabric sheet and a plurality of protrusion-forming portions connected to the fabric sheet-binding portion, each of said protrusion-forming portions defining a vacuum-molded hollow protrusion extending into a corresponding one of said micropores and having an open end or a closed end distal from said first surface of said fabric sheet, each of said vacuum-molded hollow protrusions having a height measured from a peripheral edge surrounding said open end or said closed end to said first surface of said fabric sheet, said height being greater than about half a minimum distance between said first and second surfaces, wherein said functional films are melt-bonded to said first surface of said fabric sheet so as to form said composite cloth that is substantially free of adhesive,
wherein each of said functional films comprises a plurality of functional components and a plurality of functional layers, each of said functional layers being stacked on top of each other, each of said functional layers including one or more of said functional components,
wherein one of said functional components in one of said functional films in one of said different functional regions of said composite cloth is different from another one of said functional components in another one of said functional films in another one of said different functional regions of said composite cloth, wherein each of said functional components is selected from a group consisting of an anti-ultraviolet (UV) component, a waterproof component, a vapor-permeable component, an antistatic component, a water-repellent component, a cooling component, and an electromagnetic wave-shielding component.

13. The composite cloth of claim 12, wherein said one of said functional components in said one of said functional layers is an anti-ultraviolet (UV) component and said another one of said functional components in said another one of said functional layers is a waterproof component.

14. The composite cloth of claim 12, wherein said one of said functional components in said one of said functional films is an anti-ultraviolet (UV) component and said another one of said functional components in said another one of said functional films is a cooling component and/or a vapor-permeable component.

15. A top clothing comprising the composite cloth of claim 14, said top clothing comprising different functional regions comprising an anti-ultraviolet region (UV) along a shoulder part, cooling regions extending from an armpit part along a lower sleeve part and/or down side torso parts, and a vapor-permeable region located along a back torso part, each of said functional regions corresponding in position to one of said functional films comprising the corresponding functional component.

16. The composite cloth of claim 12, wherein said protrusion-forming portions are directly and entirely bonded to said fabric sheet.

17. The composite cloth of claim 12, wherein said fabric sheet is made of one of a woven fabric and a nonwoven fabric.

18. The composite cloth of claim 17, wherein said fabric sheet is made of the woven fabric and includes a plurality of warp yarns and a plurality of weft yarns interlaced with each other to define said micropores thereamong.

19. The composite cloth of claim 12, wherein said functional films are made from a thermoplastic base material mixed with the functional components, said thermoplastic base material being selected from polyolefin, polyester, and a thermoplastic elastomer.

20. The composite cloth of claim 19, wherein said thermoplastic base material is made from polyurethane elastomer.

* * * * *